Patented May 25, 1943

2,319,984

UNITED STATES PATENT OFFICE 2,319,984

PHOTOGRAPHIC MATERIAL AND PROCESS FOR PRODUCING THE SAME

Béla Gáspár, Hollywood, Calif., assignor to Chromogen, Incorporated, a corporation of Nevada No Drawing. Application July 12, 1939, Serial No. 284,106. In Germany July 16, 1938

14 Claims. (Cl. 95—2)

The present invention relates to a multilayer taking or printing material for color photography with silver emulsion layers differently sensitized to the three primary colors. The new material is to contain colored or uncolored soluble derivatives of dyes, dye-forming substances or their soluble derivatives in at least two of the layers and a filter dye in at least one of these layers.

The invention has for its object the fixing in insoluble form in the very same silver halide emulsion layer on the one hand of the filter dyes and on the other hand of the soluble derivatives of the dyes or the dye-forming substances or their soluble derivatives. The soluble dye derivatives, the dye-forming substances, the dye components and their soluble derivatives are hereinafter called simply "potential dye bodies."

According to the invention the fixing of the dye bodies is carried out by the employment of potential dye bodies of acid character and forming their salts with basic filter dyes. In performing this reaction the potential dye bodies themselves may also be colored bodies provided that they are transparent for the light rays that are to be recorded in the layer containing them or in the underlying layers. Also the light absorption of the filter dyes should meet the same requirement.

As potential dye bodies for the production of the new photographic materials there can be used, for instance, dye components, such as amines, phenols, compounds containing a reactive methylene group and an acid radical. Furthermore, there can also be used the soluble derivatives of insoluble dyes or dye forming substances, described by the inventor in United States Patents 2,172,307 and 2,172,308, both dated September 5, 1939, such as the soluble derivatives of leuco vat dyes, bisulfite or aldehyde-bisulfite derivatives of azo dyes, the ω-sulphonic acids or sulphaminic acid salts of poly-azo dyes, the bisulphite compounds or hydrazones of azo dyes containing aldehyde or ketone groups or the bisulphite, aldehyde-bisulphite compounds or acid esters of dye-forming substances.

Basic filter dyes which can be used to form the insoluble salts with the potential dye bodies are, for example, Auramine (Schultz Farbstofftabellen, Leipzig 1931, 7th ed., vol. 1, No. 752), Thioflavine T (Schultz l. c., No. 934), Pyronine B (Schultz l. c., No. 855), Rhodamine B (Schultz l. c., No. 864), Rhodamine S (Schultz l. c., No. 858) or the dyes 10-methyl-9-(p-dimethyl-amido-benzylidene-methyl)-acridinium-methyl-sulphonate or 10-methyl-9-(p-dimethyl-amido-cinnamylidene-methyl)-acridinium - methyl-sulphonate. The two last mentioned dyes may be manufactured by heating 0.2 gram 9,10-dimethyl-acridinium-methyl sulphonate with 0.12 gram p-dimethyl-amido-benzaldehyde or 0.14 gram p-dimethyl-amida-cinnamic aldehyde respectively in the presence of a small quantity of acetic anhydride under a reflux condenser. If the dyes formed do not crystallise on standing they may be precipitated by the addition of ether. They may be purified by recrystallisation from the acetone solution (cf. Julius, Heterocyclische Polymethin-Farbstoffe aus ω- und γ-Methyl-cyclammonium-Salzen, Dresden 1929, pages 63 and 64).

In another connection and for another purpose the use of salts of esters of leuco-dyes with basic dyes for color photographic purposes is already known. The purpose of this previous proposal is to transform a dye-forming substance, which is able to yield a dye of a definite color, into a light-sensitive substance of selective sensitivity for definite light rays in such a manner that, for example, a yellow dye is formed at the places struck by the blue light rays. But because a colorless substance does not absorb blue light and also does not react to such light, salts of these colorless substances with yellow dyes have been prepared which are intended to bring about the absorption of the blue light. For this purpose the color of the final dye must be the same as the color of the filter dye.

In contradistinction to the foregoing, the absorption of the filter dye of the new material can not be the same as the absorption of the final coloring or cannot coincide with the sensitizing range if true color reproduction is to take place. On the contrary the layers are sensitized by means of silver halide and if necessary sensitized for light which is not absorbed by the filter dyes.

The new layers are sensitive because of the presence of the silver halide. They show no screening effect other than the desired filter effect on the subsequent layers but, on the other hand, they yield color-correct pictures by a suitable choice of the components of the layers.

The following table gives some examples of the composition of three-layer-materials according to the invention.

|  | Example 1 | Example 2 | Example 3 | Example 4 | Example 5 |
|---|---|---|---|---|---|
| First silver halide layer. | Blue-sensitive. Contains, if necessary, a colorless dye body to yield yellow. | Blue-sensitive. Contains if necessary, a colorless dye body to yield yellow. | Blue-sensitive. Contains a dye body to yield blue green. | Blue-sensitive. Contains a dye body to yield blue green. | Blue-sensitive. Contains a dye body to yield blue green, yellow or magenta. |
| Second silver halide layer. | Green-sensitive. Contains a salt of a dye body to yield magenta with a yellow filter dye. | Red-sensitive. Contains a salt of a dye body to yield blue green with a yellow filter dye. | Green-sensitive. Contains a salt of a dye body to yield magenta with a yellow filter dye. | Green-sensitive. Contains a salt of a dye body to yield yellow with a yellow filter dye. | Sensitive for light rays of $\lambda > 500 \mu\mu$. Contains a salt of a dye body to yield a second color with a yellow filter dye. |
| Third silver halide layer. | Red-sensitive. Contains a salt of a dye body to yield blue green with a red filter dye. | Green-sensitive. Contains a dye body to yield magenta, if necessary, in the form of a salt with a yellow or green filter dye. | Red-sensitive. Contains a yellow dye for the building up of the image. | Red-sensitive. Contains a salt of a dye body to yield magenta with a red filter dye. | Blue-sensitive. Contains a dye body to yield the third color. |

The further processing after the exposure of the new multilayer material is carried out in the known manner and depends on the kind of the potential dye bodies present in the different layers. If, for example, the layers contain leuco esters of vat dyes the conversion into the dyes is effected by oxidation. If azo dye-components are present as potential dye bodies they can be converted into the azo dyes by coupling with a diazo solution or by diazotizing and thereafter coupling with a coupling component. If the potential dye bodies are capable of reacting with the oxidation products of the developer they can be transformed into dyes by the method of so-called color-development. If the potential dye bodies are scissible derivatives of dyes themselves, the conversion is effected by splitting up the dye derivatives. If they are scissible derivatives of dye-components first the splitting up to the components is carried out and at the same time or subsequently the components are converted into dyes. Most of these reactions can be carried out in spite of the fact that the potential dye-bodies are present in the form of their salts with the basic filter dyes because these filter dyes can be split off; or they can be replaced by such metals as barium, for instance, which yield an insoluble salt, and then washed out; or they can be destroyed by oxidation. Furthermore, the filter dye can also be derived from the salt or can be destroyed with the conversion of the potential dye body into the dye before or at the same time.

The conversion of the potential dye body into the dye can be carried out uniformly throughout the whole layer independent of the presence of the image. In this case the dye is subsequently destroyed locally and in dependence on the image. As already pointed out above in the reference to color development the dye image can also be produced by locally converting the dye body into the dye.

The salts of the filter dyes used for the production of the new material can be built up from the filter dye and the dye body in the emulsion itself or in the solution used for the preparation of the emulsion; they can also be prepared beforehand and added as such to the emulsion during the latter's preparation.

The foregoing describes the use of the salts of basic filter dyes with acid potential dye bodies for practising the present invention, but in the same manner there can be used salts of acid filter dyes as, for example, Chrysophenine G (Schultz l. c., No. 726) with basic potential dye bodies. As an example of this manner of performing the invention the basic potential dye body, Benzidine, for instance, can be used and it can be fixed with the aid of an acid filter dye, methylene-bis-(1-/p-sulphophenyl/-3-methyl-5-pyrazolone) for instance. Filter dyes of the last mentioned kind are especially easily destroyed during the treatment with bi-sulphite solutions, for example.

What is claimed is:

1. The method of producing a colored image in a silver halide emulsion layer, said layer being diffusely colored by a filter dye having a predetermined absorption and being in the form of an insoluble salt with a potential dye body, which comprises, exposing said layer to form a latent image therein, decomposing said insoluble salt to yield said potential dye body, converting the potential dye body into a dyestuff image corresponding to said latent image, and treating said layer to eliminate the absorption of said filter dye therefrom.

2. The method of producing a colored image in a silver halide emulsion layer, said layer being diffusely colored by a filter dye having a predetermined absorption and being in the form of an insoluble salt with a potential dye body, which comprises, exposing said layer to form a latent image therein, decomposing said insoluble salt to yield said potential dye body, converting the potential dye body into a dyestuff image corresponding to said latent image, and treating said layer to eliminate the absorption of said filter dye therefrom by removing said filter dye from said layer.

3. The method of producing a colored image in a silver halide emulsion layer, said layer being diffusely colored by a filter dye having a predetermined absorption and being in the form of an insoluble salt with a potential dye body, which comprises, exposing said layer to form a latent image therein, decomposing said insoluble salt to yield said potential dye body, converting the potential dye body into a dyestuff image corresponding to said latent image, and treating said layer to eliminate the absorption of said filter dye therefrom by destroying said filter dye.

4. The method of producing a colored image in a silver halide emulsion layer, said layer being diffusely colored by a filter dye having a predetermined absorption and being in the form of an insoluble salt with a potential dye body, which comprises, exposing and developing said layer to form a silver image therein, decomposing said insolube salt to yield said potential dye body, converting the potential dye body into a dyestuff throughout said layer, destroying said dyestuff locally in proportion to said silver image and treating said layer to eliminate the absorption of said filter dye therefrom.

5. The method of producing a colored image in a silver halide emulsion layer, said layer being diffusely colored by a filter dye having a predetermined absorption and being in the form of an insoluble salt with a potential dye body, which comprises, exposing and developing said layer to form a silver image therein, decomposing said insoluble salt to yield said potential dye body, converting the potential dye body into a dyestuff throughout said layer, destroying said dyestuff locally in proportion to said silver image and treating said layer to eliminate the absorption of said filter dye therefrom by removing said filter dye from said layer.

6. The method of producing a colored image in a silver halide emulsion layer, said layer being diffusely colored by a filter dye having a predetermined absorption and being in the form of an insoluble salt with a potential dye body, which comprises, exposing and developing said layer to form a silver image therein, decomposing said insoluble salt to yield said potential dye body, converting the potential dye body into a dyestuff throughout said layer, destroying said dyestuff locally in proportion to said silver image and treating said layer to eliminate the absorption of said filter dye therefrom by destroying said filter dye.

7. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing said material to form a latent image in each of said layers, decomposing said insoluble salt to yield said potential dye body, forming a dyestuff image in each of said layers corresponding to the latent image therein, said potential dye body being used to form the dyestuff image in said one layer, and treating said one layer to eliminate the absorption of said filter dye therefrom.

8. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing said material to form a latent image in each of said layers, decomposing said insoluble salt to yield said potential dye body, forming a dyestuff image in each of said layers corresponding to the latent image therein, said potential dye body being used to form the dyestuff image in said one layer, and treating said one layer to eliminate the absorption of said filter dye therefrom by removing said filter dye from said layer.

9. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing said material to form a latent image in each of said layers, decomposing said insoluble salt to yield said potential dye body, forming a dyestuff image in each of said layers corresponding to the latent image therein, said potential dye body being used to form the dyestuff image in said one layer, and treating said one layer to eliminate the absorption of said filter dye therefrom by destroying said filter dye.

10. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing and developing said material to form a silver image in each of said layers, decomposing said insoluble salt to yield said potential dye body, forming a dyestuff throughout each of said layers said potential dye body being used to form the dyestuff in said one layer, destroying said dyestuff locally in proportion to the silver image in each of said layers, and treating said one layer to eliminate the absorption of said filter dye therefrom.

11. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing and developing said material to form a silver image in each of said layers, decomposing said insoluble salt to yield said potential dye body, forming a dyestuff throughout each of said layers said potential dye body being used to form the dyestuff in said one layer, destroying said dyestuff locally in proportion to the silver image in each of said layers, and treating said one layer to eliminate the absorption of said filter dye therefrom by removing said filter dye from said layer.

12. The method of producing a colored multicolor image in a multilayer photographic material having a plurality of superposed silver halide emulsion layers each being predominantly sensitive to a predetermined spectral region, one of said layers being diffusely colored by a filter dye for absorbing light to which an overlying layer is sensitive, said filter dye being in the form of an insoluble salt with a potential dye body, which comprises, exposing and developing said material to form a silver image in each of said layers, decomposing said insoluble salt to yield said potential dye body, forming a dyestuff throughout each of said layers, said potential dye body being used to form the dyestuff in said one layer, destroying said dyestuff locally in proportion to the silver image in each of said layers, and treating said one layer to eliminate the absorption of said filter dye therefrom by destroying said filter dye.

13. A multilayer photographic material comprising a plurality of superposed silver halide emulsion layers each being predominantly sensitive to a predetermined spectral region, one of said layers being predominantly sensitive to blue light, the one of said superposed silver halide layers arranged next behind said blue sensitive layer being transmittant for and predominantly sensitive to a spectral region other than blue and diffusely colored by an insoluble salt formed from a yellow filter dye and a potential dye body adapted to yield an image forming dye having a color other than yellow.

14. A multilayer photographic material comprising a plurality of superposed silver halide emulsion layers each being predominantly sensitive to a predetermined spectral region, one of said layers being predominantly sensitive to blue light, the one of said superposed silver halide layers arranged next behind said blue sensitive layer being transmittant for and predominantly sensitive to a spectral region other than blue and diffusely colored by an insoluble salt formed from a yellow filter dye and a potential dye body adapted to yield an image forming dye having a color complementary to the sensitivity of the layer.

BÉLA GÁSPÁR.